UNITED STATES PATENT OFFICE.

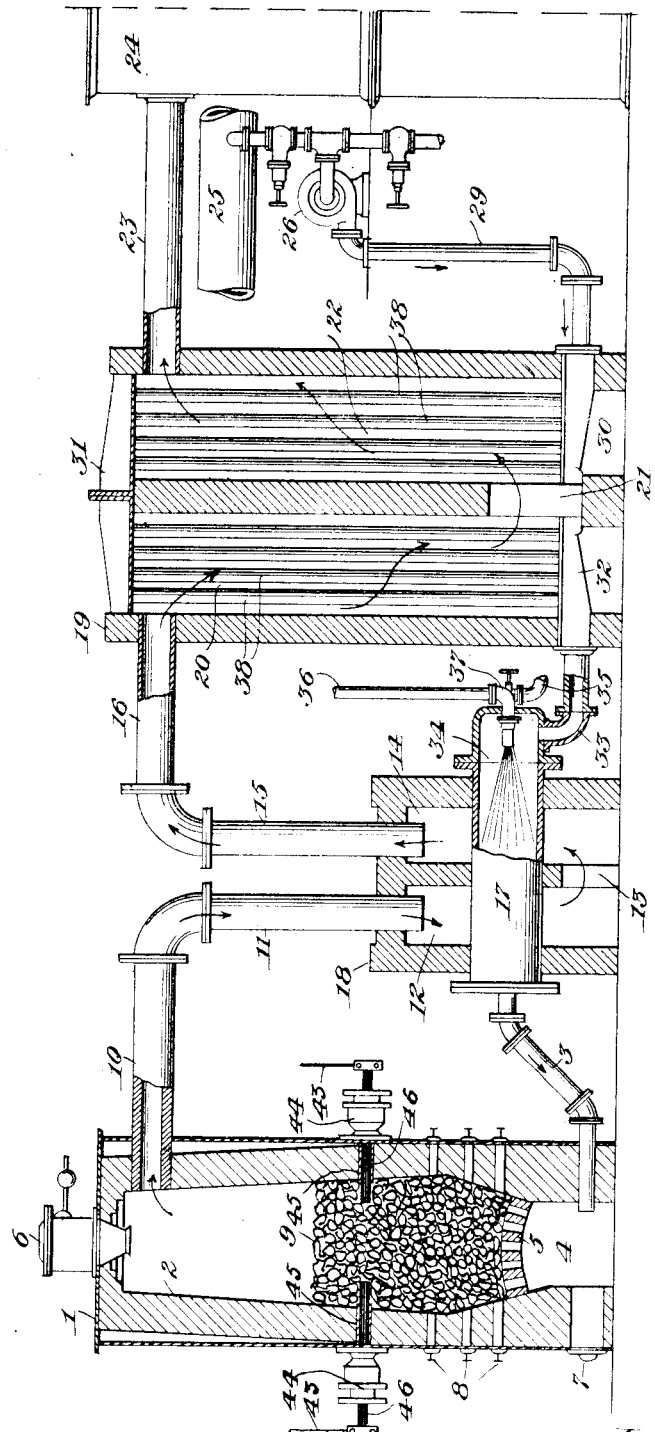

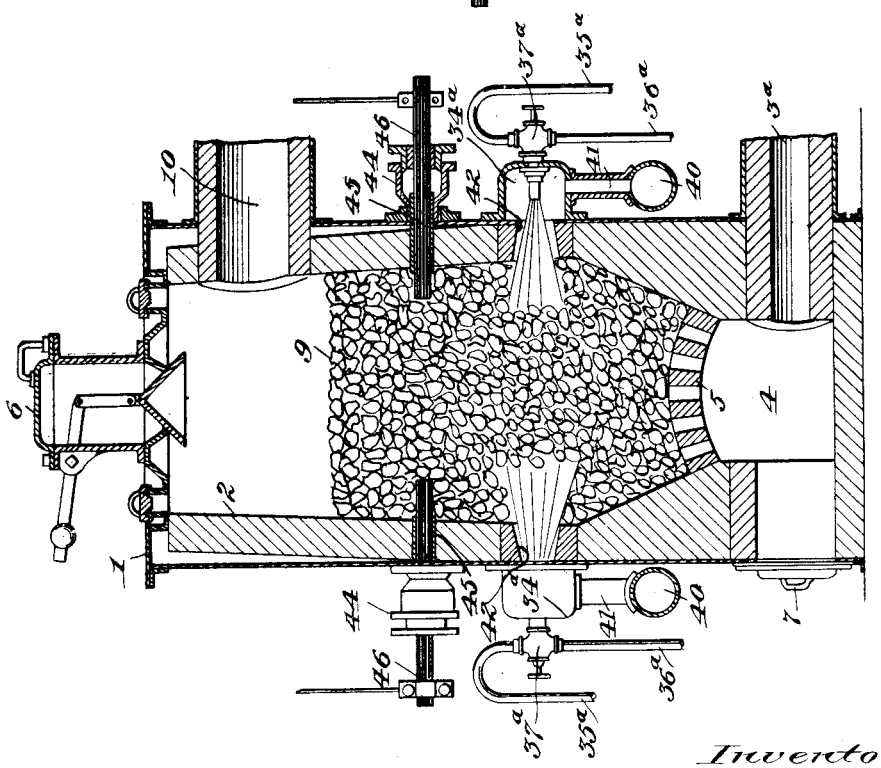

WILLIAM FRANCIS LAMOREAUX, OF ISABELLA, TENNESSEE.

PROCESS OF RECOVERING ELEMENTAL SULFUR FROM SULFUR GASES.

1,182,915.  Specification of Letters Patent.  Patented May 16, 1916.

Application filed June 19, 1915. Serial No. 35,094.

*To all whom it may concern:*

Be it known that I, WILLIAM F. LA-MOREAUX, a citizen of the United States, residing at Isabella, in the county of Polk and State of Tennessee, have invented certain new and useful Improvements in Processes of Recovering Elemental Sulfur from Sulfur Gases, of which the following is a specification.

My invention relates to an improved process or method of recovering sulfur from gases and the objects of my improvement are first, to produce practically elemental sulfur from the oxids or other compounds of sulfur such as are contained in variable admixture with air in the gases generated by or liberated from any furnace smelting, roasting or calcining pyrite ores or other sulfur-bearing materials; second, to employ gaseous or liquid reducing agents instead of solid carbonaceous reducing agents such as are usually employed for this purpose; third, to effect material economies in operation where gaseous or liquid reducing agents can be more conveniently or cheaply obtained than equivalent solid carbonaceous reducing agents; and fourth, to produce a very efficient and cheap process whereby the reactions are caused to take place completely and rapidly. I have attained these objects by the method described, illustrated and claimed in the following specification.

In U. S. Patent 1,140,310, patented May 18, 1915, to Lamoreaux and Renwick, and in a copending application of Lamoreaux, Serial No. 6909, filed February 9th, 1915, there are disclosed processes of reducing sulfur dioxid, such for example as that contained in the gases generated by or liberated from any furnace smelting, roasting or calcining pyritic ores or other sulfur-bearing materials, by maintaining the sulfur dioxid for a predetermined period in contact with incandescent carbon, and supplying the increment of heat necessary to secure practically complete reduction to elemental sulfur from a source independent of the oxidation of said carbon. According to the above disclosures, this increment of heat may be supplied electrically, for example, by passing a suitable electric current through the carbon bed, or by initially preheating the gas to a sufficiently high degree to compensate for any and all deficiency of temperature resulting from the dissipation of heat due to endothermic reactions, radiation, and other losses occurring within the reaction zone, and finally conserving and utilizing for preheating purposes the heat otherwise wasted in the gases issuing from the furnace, so that as far as possible the heat is caused to flow in cyclic order throughout the process, while the gas after having undergone the reduction reaction is removed to a suitable condenser wherein the elemental sulfur is collected.

By maintaining the sulfur-bearing gas in contact with the incandescent carbon for a predetermined period, as hereinbefore mentioned, reduction of the sulfur dioxid contained therein is brought about as may be represented by the known reactions:—

$$SO_2 + C = CO_2 + S$$

or $$SO_2 + 2CO = 2CO_2 + S.$$

Throughout these reactions, the coke, charcoal or other carbonaceous material employed is consumed and must be supplied according to the amount of oxygen present in the sulfur gases treated, whether such oxygen be present in a free state or combined with the sulfur.

Now, instead of depending upon the incandescent carbon to supply the reducing agent whereby the reactions are brought about, I have discovered that when the sulfur-bearing gas is mixed with the properly proportioned amount of a reducing agent in fluid form and said mixture is either simultaneously or subsequently subjected to a sufficiently elevated temperature for a predetermined period, in contact with incandescent carbon, as hereinbefore mentioned, there results a practically complete reduction of the sulfur dioxid without any appreciable consumption of the incandescent carbon. By "reducing agent in fluid form" I mean any suitable gas or vapor possessing commonly recognized reducing properties such for example as carbon monoxid, hydrogen, hydrogen sulfid, or the vapors or atomized liquids obtained by volatilizing, atomizing, distilling, or carbureting petroleum, bitumen, asphalt and other hydrocarbon compounds. In other words, instead of depending upon the incandescent carbon as a reducing agent to react with the sulfur dioxid, I utilize a reducing agent in fluid form for the same purpose, and in such case, the bed of incandescent carbon serves the practical purpose of enforcing and insuring an intimate intermixture of the reducing agent with the sulfur-bearing gases undergoing treatment; and further, to serve as a conducting and heating medium where it becomes necessary or desirable to employ the electric current as has been heretofore explained.

Essentially, my improved process consists in mixing the sulfur-bearing gases with a properly proportioned amount of any suitable reducing agent in a gaseous, vaporized or atomized state, then passing the mixture so produced over or through a mass of incandescent carbon or carbonaceous material, maintaining it in contact therewith for a predetermined period and supplying the increment of heat to secure practically complete reduction of the sulfur dioxid from a source independent of the oxidation of said carbon.

Since the temperatures of decomposition of the gaseous or liquid hydrocarbon compounds, utilized for reducing agents, are much lower than the corresponding decomposition temperatures of solid carbonaceous reducing agents, it is found in practice that the surfur dioxid reacts more energetically with the first mentioned substances and such reactions usually take place at lower temperatures, resulting therefore in an economy in the requirements and utilization of the heat employed throughout the process.

Among other advantages possessed by my new process is the more positive control of the reducing action, since it is possible to immediately alter the proportion of the reducing agent in correspondence with the amount of oxids or free oxygen contained in the gases treated. Of course it is desirable to exclude all unnecessary entrance of air since this would cause useless waste of the reducing agent; however, a certain amount of extraneous air is not objectionable, for it tends only to increase or augment the temperature within the reducing or reaction zone of the furnace. Sufficient fluid fuel may be added to serve as the reducing agent and to combine with all oxygen present; in all cases, however, it is desirable so to proportion the fluid reducing agent that little or no consumption of the incandescent carbon takes place.

Any form of gaseous or liquid reducing agent may be used but when liquid substances are used they should be vaporized or otherwise converted into gas, or minutely subdivided. Powdered or pulverized fuels may also be used provided they are sufficiently fine and are blown into or otherwise introduced into the gas stream with sufficient velocity to be carried along thereby and reach the reaction zone in the furnace. Another satisfactory method of introducing either gaseous, liquid, semi-liquid or pulverized substances to serve as reducing agents consists in admitting or injecting them directly into the reaction zone of the furnace through twyers or blow-pipes provided for the purpose, as will be hereinafter illustrated and described.

Other advantages to be obtained are in the avoidance of elevating and handling large amounts of solid fuels and likewise the inconvenience of handling the resultant ash and clinkers, since the gaseous reducing agents are completely consumed. I am also enabled, through the use of gaseous reducing agents, to avoid the otherwise frequent accumulation of clinkers and consequent effect of channeling and formation of "blow-holes" within the mass of incandescent carbon through which the untreated gases are liable to pass without being sufficiently subjected to the reducing reaction. Where electric current is employed the body of incandescent coke, remaining more uniform in composition, maintains likewise more uniformly its properties of electrical resistance and conductivity, thereby insuring perfect control of the temperature within the reaction zone.

I attain the objects of my invention in a number of ways, several of which are illustrated in the accompanying drawings forming a part of this specification, in which—

Figure 1 is a view, partly in section, representing the arrangement of the apparatus employed, comprising the reduction furnace, a carbureting and mixing furnace for vaporizing liquid fuels when used for producing the gaseous reducing agent, and a recuperative furnace wherein the waste heat is conserved and utilized for preheating purposes; Fig. 2 is a view, partly in section, representing one form of reduction furnace equipped with twyers or blow-pipes for the purpose of admitting or injecting directly, into the reaction zone the substances employed as reducing agents; Fig. 3 is a view, partly in section, representing a down-draft type of reduction furnace wherein the substances employed as reducing agents are admitted or injected through the top of the furnace, simultaneously admixing with the sulfur-bearing gases to be treated and thence passing downward through the mass of incandescent coke wherein the reducing reaction is brought about.

In Fig. 1 the numeral 1 designates the reduction furnace, in which 2 designates the furnace shaft having a gas-inlet pipe 3 entering into chamber 4 at the bottom, above which is formed the perforated arch 5 which serves the purpose of supporting the mass of coke 9 to be placed within the furnace shaft. A gas exit 10 is provided in the upper portion of the shaft. The body of coke 9 is charged into the furnace shaft through the charging hopper 6 which is so arranged as to admit the charges of coke and at the same time exclude the entrance of air from the outside or escape of gas from the inside of the furnace. Any ashes from the consumed coke or other carbonaceous material as they descend through the furnace shaft are permitted to pass downward through the perforated arch 5 into the chamber 4 where they can be removed from time to time, through the cleaning door 7. Sight holes 8 are provided for the inspection of the interior condition of the furnace.

The sulfur-bearing gases to be treated are drawn from their source of production through the flue or gas main 25 by means of the centrifugal fan 26 which in turn delivers the gas through the pipe 29 to a recuperative furnace which in this case, for the purpose of illustration, is of the double surface type, although any standard make may be employed. A recuperative furnace of this type will ordinarily consist of a brickwork chamber 19, divided into two compartments 20 and 22, connected by a passage 21. With a suitable arrangement of pipes 38 connecting the top and bottom manifolds 31, 30 and 32, respectively, the gases to be preheated are compelled to flow through the pipes, while the exit gases from the reduction furnace carrying the waste heat to be conserved and utilized for preheating purposes (after passing through the carbureting and mixing furnace 18) are compelled to flow between and around the pipes 38, thence through the flue 23 to the condensing chamber 24 where the sulfur may be condensed and collected. The two gases, i. e., the gas to be preheated and the gas employed for heating purposes are thus prevented from intermingling and mixing; but flowing in counter-parallel directions, the hotter gas transmits its heat through the walls of the pipes 38 to the cooler gas within, thereby heating the latter gas to a temperature approximating that of the hotter gas.

From the recuperative furnace, the now preheated sulfur-bearing gas is delivered through the pipe 33 to the carbureting and mixing cylinder 17 (shown partly in section) which is inclosed within the brickwork chamber 18. This chamber is divided vertically into compartments 12 and 14 connecting with each other by means of the passage 13 and so arranged that the hot exit gas from the reduction furnace enters the chamber 18 through pipe 11, passes over and around the carbureting cylinder 17 and thence leaves through the pipes 15 and 16 to the recuperative furnace. At one end of the carbureting cylinder is connected the mixing chamber 34 provided with an atomizing nozzle 37, the latter having oil and air pipes 35 and 36, respectively, for controlling the introduction of the oil or other liquid substance to be employed as the reducing agent. Or, in case a stable gaseous reducing agent, such as carbon monoxid, is used, it can be admitted directly to the nozzle 37. By either of the just mentioned arrangements, the heated sulfur-bearing gas is caused to enter the mixing chamber 34, there to be mixed with the properly proportioned amount of reducing agent, and passing forward into the cylinder 17 is still further heated and gasified, in which condition it is ready to pass through pipe 3 directly to the reduction furnace where it is brought into contact with the mass of incandescent carbon 9. It is evident, from this description, that the waste heat contained in the exit gases from the reduction furnace may be conserved and utilized for the purpose of preheating the sulfur-bearing gases to be treated, also to assist in gasifying the reducing agent employed and to carburet the gases undergoing treatment prior to entering the reduction furnace. In case, however, due to endothermic chemical reactions or heat losses due to radiation or other causes, a sufficiently high degree of temperature to secure substantial completeness of reaction cannot be maintained within the mass of carbon, I then resort to the use of an electric heating current transmitted through the incandescent carbon bed, as disclosed in Patent 1,140,310, above referred to. Means for electrical heating may comprise electrodes 46 connected to the conductors 43, and passing through suitable packing glands 44 and porcelain insulating tubes 45, whereby the electric current may be supplied to the coke mass 9.

Fig. 2 illustrates a form of reduction furnace, similar to that shown in Fig. 1, except that it is equipped with twyers for the direct introduction into the reaction zone of the furnace of such reducing agents as are employed in my new process. The sulfur-bearing gases undergoing treatment are caused to enter the furnace through the pipe 3ª passing into the chamber 4 and thence through the perforated arch and upward through the mass of incandescent coke 9. At the same time the gaseous reducing agent, such for example as carbon monoxid, led from its source of production by means of the pipes 40, is caused to pass through the connection pipes 41 into the chambers 34ª, thence through the twyers 42 directly into the mass of incandescent coke 9 where it mixes with the sulfur-bearing gases that have already entered from below as just described. The reducing reaction immediately takes place provided the temperature is of sufficiently high degree, any deficiency of heat being supplied electrically or by other means hereinbefore mentioned. In case it is desired to employ liquid substances, such for example as crude oil or petroleum, as the reducing agent, said liquids can be introduced by means of any suitably designed atomizer or spray nozzle 37$^a$ provided with oil and air pipes, 35$^a$ and 36$^a$, respectively, for controlling the introduction of the oil or other liquid to be employed as the reducing agent. The oil thus atomized is immediately vaporized and decomposed upon entering through the twyers 42 into the reaction zone where it at the same time encounters and reacts with the sulfur-bearing gases entering from below. In order to promote the vaporizing and carbureting action, it is frequently found advantageous to admit a portion of the sulfur-bearing gases, previously highly preheated, through the pipes 40 and 41 thence into the mixing chamber 34$^a$, the mixture thus obtained passing through the twyers 42 directly into the reaction zone as above mentioned. As in the furnace shown in Fig. 1, electrical heating means may be provided, and such means may consist, as before, of electrodes 46 passing through suitable packing glands 44 and porcelain insulating tubes 45.

Fig. 3 is a view, partly in section, of a third modification in which is employed the down-draft principle of passing the sulfur-bearing gases through the reduction furnace. In this figure, numeral 1 designates the reduction furnace, in which 2 designates the furnace shaft containing the mass of coke 9 in turn supported upon the perforated arch 5 beneath which is formed the chamber 4. The latter chamber serves the purpose of forming a receptacle for any ash accumulating from the consumed coke, which may from time to time be removed through the cleaning door 7; it also affords an opening for the exit pipe 10$^b$ through which the sulfur-bearing gases after having undergone the reducing action are withdrawn to a suitable condensing chamber where the sulfur is deposited and collected. Through one side, in the upper portion of the furnace shaft, an opening 6$^b$ is provided for replenishing the coke column as the latter is slowly consumed or otherwise requires renewal. The top of the furnace shaft 2 is covered with a water-cooled metal plate provided with several poking holes 50 for inspecting and leveling the top of the coke mass within the furnace. Upon this top plate and located centrally is the mixing chamber 34$^b$ provided with the atomizing or spraying nozzle 37$^b$, the latter having oil and air pipes 35$^b$ and 36$^b$, respectively, for controlling the introduction of the oil or other liquid substance to be employed as the reducing agent. The inlet pipe 3$^b$ conveying the sulfur-bearing gases to be treated, also connects with the mixing chamber 34$^b$, as shown.

There are also provided, as in the other modifications of the furnace, the electrodes 46, passing through suitable packing glands 44 and porcelain insulating tubes 45, whereby the electric current may be supplied to the coke mass 9.

The sulfur-bearing gas, preferably preheated, is caused to enter through the pipe 3$^b$ into the mixing chamber 34$^b$; simultaneously the properly proportioned amount of oil or other liquid reducing agent is admitted through the nozzle 37$^b$. The atomized liquid or spray, thoroughly mixed with the sulfur-bearing gases, is passed downward through the mass of incandescent coke 9 maintained at the required temperature by means of the passage of an electric current, applied by means of the electrodes 46, into and through the said mass of coke. By the proper regulation of the current so used, any degree of temperature can be maintained, while at the same time the amount of carbon required for the reduction can be proportioned and supplied through the agency of the gaseous or liquid reducing substances, as heretofore explained. With the proper regulation of temperature, a practically quantitative reduction of all sulfur compounds takes place during the interval in which the said gases are passing through the mass of incandescent carbon, and finding their way downward into the chamber 4, they pass out of the furnace through the exit pipe 10$^b$, whence they are conducted to a suitable condensing chamber, wherein the elemental sulfur is collected.

In either of the modifications heretofore described, by mixing the sulfur-bearing gases with the properly proportioned amount of gaseous or liquid reducing agents and subsequently or simultaneously passing said mixture through or over a mass of incandescent coke or other carbonaceous material within the reduction furnace, it is possible to secure a rapid and complete reduction of the elemental sulfur from its gaseous compounds existing in the gases under treatment without any appreciable consumption of the incandescent carbon.

Either process is a continuous one and the separation of elemental sulfur from its gaseous compounds is rapidly and completely effected so long as the properly proportioned admixture of the reducing agent with the sulfur-bearing gases is maintained at the proper working temperature, in the manner hereinbefore set forth. Suitable working conditions for substantially quantitative reduction are disclosed in Patent No. 1,140,310 above referred to.

Referring to the furnaces illustrated and described, within which the reduction process is caused to take place, it will be understood that the size and shape of the furnace and its walls, the location and size of the inlet and outlet openings for the admission and escape of the gases, and whether said openings are so arranged as to cause the gases to pass vertically upward or downward or to pass horizontally through or over the mass of carbon or carbonaceous material, also the method of introducing the gaseous, liquid, semi-liquid or pulverized substance or substances employed as the reducing agent have no bearing on my metallurgical or chemical process, other than to show several of the various ways by which it is carried into effect, and may be materially modified without in the least departing from the scope of my invention. It is however essential to the best results that the furnace construction should be such as absolutely to preclude the formation of blow-holes or channels through which the gas may flow without coming into contact for the necessary time with carbon at the necessary temperature.

I claim:—

1. The process of reducing sulfur dioxid to elemental sulfur, which consists in mixing the gas containing sulfur dioxid with a reducing agent, passing the mixture in contact with a bed of incandescent carbon, maintaining it in contact therewith for a predetermined period, and supplying the increment of heat necessary to secure practically complete reduction of the sulfur dioxid from a source independent of the oxidation of said carbon.

2. The process of reducing sulfur dioxid to elemental sulfur, which consists in mixing the gas containing sulfur dioxid with a reducing agent, passing the mixture in contact with a bed of incandescent carbon, maintaining it in contact therewith for a predetermined period, and supplying the increment of heat necessary to secure practically complete reduction of the sulfur dioxid by passing an electric current through said bed.

3. The process of reducing sulfur dioxid to elemental sulfur, which consists in mixing the gas containing sulfur dioxid with a reducing agent in proportion to unite with the free and combined oxygen of the gas stream, passing the mixture in contact with a bed of incandescent carbon, maintaining it in contact therewith for a predetermined period, and supplying the increment of heat necessary to secure practically complete reduction of the sulfur dioxid from a source independent of the oxidation of said carbon.

4. The process of reducing sulfur dioxid to elemental sulfur, which consists in mixing the gas containing sulfur dioxid with a reducing agent in proportion to unite with the free and combined oxygen of the gas stream, passing the mixture in contact with a bed of incandescent carbon, maintaining it in contact therewith for a predetermined period, and supplying the increment of heat necessary to secure practically complete reduction of the sulfur dioxid by passing an electric current through said bed.

In testimony whereof I affix my signature in presence of two witnesses.

WM. FRANCIS LAMOREAUX.

Witnesses:
R. L. KIRKPATRICK,
J. L. SAPPINGTON.